United States Patent [19]

Sawyer, Jr.

[11] 4,062,694
[45] Dec. 13, 1977

[54] STABLE PARTICULATE SUSPENSIONS

[75] Inventor: Edgar W. Sawyer, Jr., Hagerstown, Md.

[73] Assignee: International Telephone and Telegraph Corporation, Nutley, N.J.

[21] Appl. No.: 745,746

[22] Filed: Nov. 29, 1976

Related U.S. Application Data

[63] Continuation of Ser. No. 595,471, July 14, 1975, abandoned.

[51] Int. Cl.² .............................................. C09C 3/00
[52] U.S. Cl. .................................. 106/309; 106/288 B; 106/308 B; 106/308 Q; 106/71
[58] Field of Search ................... 106/70, 71, 72, 309, 106/288 B, 288 Q, 308 Q

[56] References Cited

U.S. PATENT DOCUMENTS

| | | | |
|---|---|---|---|
| 3,509,066 | 4/1970 | Jacobs et al. | 106/72 |
| 3,753,753 | 8/1973 | Kirby | 106/288 B |
| 3,846,147 | 11/1974 | Lapper | 106/288 B |
| 3,850,655 | 11/1974 | Adams | 106/309 |

*Primary Examiner*—Winston A. Douglas
*Assistant Examiner*—J. V. Howard
*Attorney, Agent, or Firm*—John T. O'Halloran; Peter C. Van Der Sluys

[57] ABSTRACT

Methods and apparatus are disclosed for providing homogeneous liquid suspensions of materials that are not readily wet by the liquid. Sulfonate based dispersants in combination with a gelling grade clay mineral provide stable and homogeneous suspensions of materials such as sulfur and coal dust in water. When attapulgite clay is used as a suspending agent for coal dust in flammable liquid hydrocarbons the fly ash combination by-products remain similarly suspended in the effluent flue gases to facilitate the removal of the fly ash within the flue assembly.

5 Claims, No Drawings

STABLE PARTICULATE SUSPENSIONS

This is a continuation, of application Ser. No. 595,471, filed July 14, 1975, now abandoned.

BACKGROUND OF THE INVENTION

The high cost of fuel for transporting goods and materials has led to the development of alternate methods of shipment. One effective method for transporting substantial quantities of pulverized material consists in suspending the materials in a suitable liquid and piping over long distance pipe lines.

The current fuel shortage has also revived interest in the abundant quantities of coal available in certain regions of the United States. One method proposed for the shipment of coal is to pulverize the dust into ultrafine particles and to suspend the particles in a water slurry for pumping from the coal producing areas to the distant power plants and factories for fuel and chemical utilization.

Since long distance pipe lines are usually required it is essential that the pulverized materials being transported remain suspended in the liquid medium. The settling out of the particles would obviously cause the pipe to clog and seriously interfere with the flow of materials. Standard methods for dispersing materials, such as coal dust and sulfur powder, have not proven effective over these long transportation distances since the suspending agents used in combination with the dispersants tend to settle over the relatively long periods of time. Materials which are used for suspending the coal particles, for example, become dispersed by the dispersing agents used for dispersing the coal particles. Dispersing the suspending agents causes the suspending agents themselves to settle from the suspension so that they become ineffective resulting in the ultimate settling of the coal particles. Standard dispersing agents such as tetrasodium pyrophosphate (TSPP) as mentioned for example in U.S. Pat. No. 3,509,066 are generally ineffective when used with particles that are not wet by the suspending medium since the tetrasodium pyrophosphate causes the clay to become dispersed so that the particles drop from suspension.

The purpose of this invention therefore is to disclose materials for dispersing particles in liquids that are incapable of wetting the particles and methods for keeping the particles in suspension for extended periods of time.

SUMMARY OF THE INVENTION

The invention comprises a method for forming an aqueous suspension of particulate materials in a liquid medium and for providing means to prevent the particulate materials from settling out of the suspension over long periods of time.

One embodiment of the invention provides a method for suspending solid fuel particles in a flammable liquid and suspending the resultant combustion by-products within the effluent gaseous exhaust stream.

GENERAL DESCRIPTION OF THE INVENTION

A finely divided gelling grade clay is a preferred suspending agent because of its abundant availability and its relative chemical inertness. The use of attapulgite and sepiolite clays as suspending agents is disclosed within U.S. application Ser. No. 539,214, filed Jan. 7, 1975 now abandoned and assigned to the common assignee of this invention. The aforementioned application, incorporated herein by way of reference, describes one method for employing particulate clay particles as suspending agents, and carefully controlling the amount of dispersants in order to prevent the clay particles themselves from settling out of an aqueous suspension. The same application deals with the problem of suspending a calcium compound in a water slurry and is directed toward methods and materials for providing a suspension in which the suspended material is at least slightly soluble. The small quantities of dissolved calcium renders the water slurry slightly basic and the particular dispersants chosen work quite well in controlled amounts added to the slightly basic suspending medium. The practitioner in the field of Surface Chemistry understands that the interaction between a particle to be suspended, and the suspending medium, can greatly determine whether the particle will be wet by the material of the suspending medium. Materials which are highly insoluble in the suspending medium, therefore, are extremely difficult to disperse since these materials tend to have a greater affinity toward molecular attraction between their own component molecules and generally repel the molecules of the suspending medium.

One of the chemical properties of the suspending medium that is in part determinative of whether particles will disperse and become wetted in a medium is the degree of acidity or basicity of the medium as described above relative to the calcium suspension. Certain dispersing and wetting agents, for example, are effective in a basic medium and others are only effective in a medium which tends to be slightly acidic. I have discovered that sulfonate type dispersing agents can be used to promote the wettability and dispersion of coal dust particles in water, and that as much as 3% powdered attapulgite clay can be added to the mixture to prevent the coal from settling out of the water without dispersing or settling the clay. The reason for the good suspending properties of the attapulgite material is not well understood, however, it is thought to be in some way connected with the presence of isolated crystal sites on the clay surface which can function alternatively as acids or bases relative to the chemistry of both the particles to be suspended and the suspending medium.

The combination of sulfonate type wetting and dispersing agents, hereinafter only referred to as dispersant, and the powdered clay suspending agent was also employed in order to facilitate a suspension of sulfur powder. The sulfur powder was even less miscible in water that the pulverized coal since the cohesive forces of attraction for the sulfur greatly exceed the adhesive forces exerted by the water molecules. The use of the sulfonate dispersants and the attapulgite clay resulted in stable homogeneous suspension of sulfur in water which had good flowing properties and did not settle out even after extended periods of time.

Similar results were obtained when cationic dispersing agents and clay particles were used in a flammable suspending medium such as methanol. In this instance the attapulgite clay provided a dual function. The first function was that of promoting suspension of the ultrafine dust particles in the methanol medium for the purpose of long distance pumping without settling, and the second function was to provide for the suspension of the combustion by-products when the coal-methanol suspension was ignited. Although the mechanism by which the finely dispesed attapulgite clay prevented the soot particles from settling on the walls of the flue chimney is not well understood one explanation lies in the similarity between the surface physics of particles in a liquid suspension and between particles in a gaseous suspension such as exists in the ambient atmosphere over the combustion flame.

When explosive-free conditions are necessary, for example, in transporting fine coal dust powder from within the mine, then non-flammable chlorinated hydrocarbons can be employed and the flammable liquid could displace the non-flammable liquid at the point of destination. Chlorinated hydrocarbons which are effective are the chlorinated ethanes such as trichloroethylene.

DESCRIPTION OF THE PREFERRED EMBODIMENT

EXAMPLE 1

1 gram of Na lignin sulfonate dispersing agent was added to 147 grams of water while stirring the water to promote mixing. After the dispersant was completely mixed into the water, 12 grams of attapulgite clay powder, described as type Min-U-Gel 200, was then added while the water was kept slightly agitated by stirring. 240 grams of fine sulfur powder was then gradually added while the stirring process was continued. It was noticed at this time that the sulfur readily mixed with the water containing the sulfonate dispersant and the attapulgite suspending agent, and that the sulfur particles remained in homogeneous suspension in the water long after the stirring was discontinued.

The following test was performed in order to determine whether the sulfur powder without the sulfonate dispersant would similarly provide a homogeneous suspension.

EXAMPLE 2

12 grams of attapulgite clay were added to 148 grams of water in the manner as described above. After the attapulgite clay was sufficiently suspended in the water, 240 grams of the sulfur powder was then added while keeping the suspension in constant agitation by stirring. The sulfur did not readily mix in the attapulgite-water suspension but after prolonged stirring it was found that a relatively homogeneous mixture could be obtained.

In order to determine the properties of a sulfur suspension in water without the attapulgite clay suspending agent a third sample was prepared using only the sulfonate dispersant.

EXAMPLE 3

In this sample, 1 gram of the sulfonate dispersant was added to 159 grams of water under continuous stirring as described in the first two examples. 240 grams of sulfur powder were slowly added to the mixture by continuously stirring the mixture in order to facilitate mixing as described in Examples 1 and 2 above. Suspension of the sulfur powder in the sulfonate-water mixture readily occurred due to the good dispersant materials of the sulfonate.

In the three samples prepared above, the total weight for the suspension was calculated to result in a 400 gram mass so that the weight of the powder material was kept constant throughout the comparison and the weight of the water, sulfonate and attapulgite clay were adjusted accordingly.

In order to determine whether the sulfur particles would remain in suspension, the three samples were allowed to settle for 24 hours before a visual determination was made on the settling properties of the suspension. The suspension containing the sulfonate dispersant and attapulgite clay was found to be mainly homogeneous except for the presence of a small amount of sulfur floating on the surface of the sulfonate-water suspension. The sulfur in the example containing the attapulgite clay without the sulfonate dispersant was found to have completely separated from the liquid by the process known as syneresis. The sample containing the sulfonate dispersant without the attapulgite clay was found to have settled into a hard, compact mass at the bottom of the container.

Subsequent attempts to increase the amount of sulfonate dispersant up to 4 grams and to decrease the amount of atapulgite clay to 9 grams produced a suspension that was difficult to mix but remained homogeneously in suspension over the same 24 hr. increment. The higher quantity dispersant sample, however, was considered too thick a paste for the purpose of materials transport since the viscosity measured as high as 20,000 cps on a Brookfield Viscometer at ten revolutions per minute. The suspension of Example 1 containing 1 gram sulfonate dispersant and 12 grams attapulgite clay, for example, measured 3,800 cps on the Brookfield Viscometer at the same rate of ten revolutions per minute and had good flowing properties.

In order to determine an effective operable range for both the dispersant and the clay, the sulfonate dispersant was varied from 0.7 grams to 2 grams and the attapulgite clay content was varied from a maximum of 12.0 grams down to 9 grams. This represents a range in the dispresing agent from 0.1 to 0.5% by weight of the total suspension and a range in clay from 2.25% to 3% based on the total suspension weight. The sulfur content was allowed to vary from 60% sulfur at the 12 gram atapulgite range to 63% at the 9 gram attapulgite range. In all the samples, which included both the sulfonate dispesant and the attapulgite clay, the sulfur remained in suspension over a period of two months with negligible settling even at the high 63% sulfur level.

In order to determine whether other sulfonate type dispersant agents perform similarly with the attapulgite clay the following materials were evaluated: (1) blends of naphthylene-formaldehyde sulfonates with polyacrylates, (2) blends of naphthylene-formaldehyde sulfonates with polymethacrylates, (3) sulfonate bark-extract salts, (4)sulfonated spent sulfite liquor salts, and (5) sulfonated lignins. Another clay which was similarly evaluated with these dispersants was sepiolite.

Results showed that the aforementioned sulfonate dispersing agents were effective with either the sepiolite or attapulgite clay or mixtures of both clays for providing stable homogeneous suspensions of the sulfur powder in water.

In order to determine whether the combination of sulfonate dispersant material and the clay suspending material is operative for materials other than sulfur, the following samples were prepared.

EXAMPLE 4

2 grams of sulfonate dispersant material and 4 grams of the attapulgite clay (designated earlier as Min-U-Gel 200) were added to 154 grams of water as described for the earlier examples. 240 grams of coal dust were then added taking care to keep the liquid in agitation by stirring continuously and adding the coal dust in small quantities until completely mixed. The coal dust readily

EXAMPLE 5

In order to determine the effect of the sulfonate dispersant in the absence of attapulgite clay, 2 grams of sulfonate dispresant were added to 158 grams of water, and 240 grams of coat dust were introduced in the same manner as described for Example 4 above. The coal dust was found to mix readily with the water, but the coal particles began to settle out of the mixture shortly after the stirring motion was discontinued.

EXAMPLE 6

Subsequent ranges of sulfonate dispersants from as low as 0.7 grams up to 2 grams with varying amounts of attapulgite clay from 12 grams to 4 grams showed relatively equivalent anti-settling properties. This represents a range in dispersing from 0.1 to 0.5% and a range in clay based on 1 to 3% of the total suspension weight.

Experiments with coal dust for different coal types indicate a wide variation in mineral content, soluble substances, and wetting properties for the various coal types. These variations subsequently require differing amounts of dispersants and attapulgite clay within the ranges described in order to obtain optimum rheological properties. The use of the sulfonate dispersants and the attapulgite clay suspending agents have been found to be effective for all types of coal dust investigated.

Other mineral suspending agents that are equally effective for the sulfur and coal dust suspensions are sepiolite (as mentioned earlier), Wyoming bentonite and hectorite. Experiments with these different clay types show that all known types of gelling-grade hydrous silicates such as aluminum, magnesium and calcium type clays are effective suspending agents with the sulfonate type dispersants.

Organic liquids used as carriers for gasification of coal, such as methanol and lower molecular weight hydrocarbons, are also suitable for use with cationic dispersants and clay suspending agents, since the clay suspending agent provides further application in preventing soot particles from adhering within the flue chimney.

Other inorganic, organic and metal organic powders such as iron oxide ores and pigments may be suspended within compatible liquid suspending mediums within the scope of this invention. One example of an organic pigment is copper phthalocyanine, and operable examples of metal oxide powders are tin oxide grinding powders and iron oxide ores.

Several examples have been described as indicative of materials which fall within the scope of this invention. These examples are by way of illustration only and are in no way determinative of the scope of this invention which finds application wherever easy-to-prepare slurries having good rheological and storage properties are desired.

What is claimed is:

1. A method for forming a stable homogeneous suspension between water and particles not readily wet by water and employing a flocculated clay suspending agent comprising the steps of:
   adding 0.1 to 0.5% by weight of a wetting type dispersing agent to water to disperse the particles without dispersing clay;
   adding the particles to the water in an amount equal to at least 60% of the total weight of the suspension to form a mixture between the water and the particles; and
   adding a gelling grade clay in an amount from 1 to 3% based on the total suspension weight to suspend the particles in water.

2. The method of claim 1 wherein the particles are selected from the group consisting of powdered coal and powdered sulfur.

3. The method of claim 1 wherein the wetting type dispersing agent is selected from the group consisting of sulfonates and acrylates.

4. A coal dust-water slurry having good rheological properties comprising:
   at least 60% by weight of finely divided coal dust in water;
   0.10 to 0.50% by weight of a wetting type dispersing agent selected from the group consisting of sulfonates and acrylates; and
   1 to 3% by weight of a gelling grade clay selected from the group consisting of attapulgite, sepiolite and bentonite.

5. A sulfur dust-water slurry having good rheological properties comprising:
   at least 60% by weight of finely divided sulfur powder in water;
   0.10 to 0.50% by weight of a wetting type dispersing agent selected from the group consisting of sulfonates and acrylates; and
   1 to 3% by weight of a gelling grade clay selected from the group consisting of attapulgite, sepiolite and bentonite.

* * * * *